United States Patent [19]

Bernard et al.

[11] Patent Number: 4,639,929
[45] Date of Patent: Jan. 27, 1987

[54] CONTINUOUS METHOD OF GRAPHITIZING LONG CARBON-CONTAINING PRODUCTS AND A FURNACE FOR CARRYING OUT THE METHOD

[75] Inventors: Jean-Claude Bernard, Sainte-Foy-les-Lyon, France; Patrick Chabrier, La Corogne, Spain; Bernard Tahon; Jean-Marc Tesoriere, both of Le Fayet, France; Domingo Ortega, Paris, France

[73] Assignee: Societe des Electrodes et Refractaires "Savoie" (Sers), Paris, France

[21] Appl. No.: 619,591

[22] PCT Filed: Oct. 4, 1983

[86] PCT No.: PCT/FR83/00200
§ 371 Date: Jun. 6, 1984
§ 102(e) Date: Jun. 6, 1984

[87] PCT Pub. No.: WO84/01368
PCT Pub. Date: Apr. 12, 1984

[30] Foreign Application Priority Data

Oct. 6, 1982 [FR] France ............... 82 17020

[51] Int. Cl.⁴ ................................ H05B 3/60
[52] U.S. Cl. ........................ 373/120; 373/58
[58] Field of Search .............. 373/120–126, 373/27, 29, 58; 201/13, 14, 19; 202/215

[56] References Cited

U.S. PATENT DOCUMENTS 2,621,218  6/1951  Juckiess.
4,017,673  4/1977  Michels ............... 373/120

FOREIGN PATENT DOCUMENTS 2162246  7/1973  Fed. Rep. of Germany.
2311467  9/1974  Fed. Rep. of Germany.
2316494  10/1974  Fed. Rep. of Germany.
2272031  12/1975  France.
2293399  7/1976  France.

Primary Examiner—Roy N. Envall, Jr.
Attorney, Agent, or Firm—Oblon, Fisher, Spivak, McClelland & Maier

[57] ABSTRACT

The method of the invention concerns continuous graphitization of long pre-cooked carbon-containing products.

It comprises displacing the carbon-containing products in a column, along a horizontal axis of passage, inside a furnace where the packing is a fragmented carbon-containing material which is not displaced within the furnace. The column is put under stress by rams and is heated by the Joule effect.

The method can be applied particularly to the production of graphite electrodes for arc furnaces in steel works.

20 Claims, 8 Drawing Figures

CONTINUOUS METHOD OF GRAPHITIZING LONG CARBON-CONTAINING PRODUCTS AND A FURNACE FOR CARRYING OUT THE METHOD

BACKGROUND OF THE INVENTION

1. Field of the Invention

The method which forms the subject matter of the invention concerns graphitisation of long carbon-containing products for the purpose of obtaining electrodes, long bars, tubes of circular or other section or any other long products made of graphite.

The invention also concerns a furnace for carrying out the method of the invention.

2. Discussion of the Background

Quite a large number of methods have been proposed for continuously graphitising carbon-containing materials in the form of solid pieces or in granular form. These processes have not generally given satisfactory results, because of the difficulty in finding refractory materials through which carbon-containing products, brought to near 3000° C., can be moved, and also because of the difficulties encountered in heating these products to 3000° C.

German patent No. 2 311 467 describes a method of continuously graphitising cylindrical carbon-containing products, which are passed vertically through the inside of a furnace.

In the method described in German patent No. 2 311 467, as shown in FIG. 1, the carbon-containing products (1) to be graphitised (which, in the case shown in the drawing, are bars of circular section arranged vertically end to end) enter the furnace (2) through a feed aperture formed by a guiding tube (3) and an annular graphite sleeve (4), which is connected to one pole of a source of electric current. The internal diameter of the sleeve is such that a large radial clearance is left between the sleeve and the column of carbon-containing products. Instead of passing directly between the sleeve and the carbon-containing products, the electric current passes through the coke particles (5) which fill the interior of the furnace (2) and are in contact both with the outer wall of the sleeve (4) and also with the column (1) of carbon-containing products, in a zone which starts below the sleeve, at the place where the caving-in slope of the coke, which leaves a funnel-shaped gap (6) below the sleeve, comes into contact with the column of carbon-containing products. The column is thus progressively heated, both through radiation and heat conduction from the coke particles, brought to a high temperature by the electric current passing through them and also through direct heating by the electric current which flows through the column below the funnel-shaped space (6).

At the same time as the column of carbon-containing products moves down into the furnace, it is accompanied by the layer of coke granules in the vicinity of the column. Thus coke granules are continuously fed into the top of the furnace at (8), to replace those which are extracted therefrom at the bottom by means of the rake (10) and discharge tray (9). Downstream of the tray, contact members (7) provide a connection outside the furnace between the column of carbon-containing products and the other pole of the source of electric current.

Electrical contact between the cylindrical lengths of carbon-containing products is provided for, at each end thereof, by gaphitized paste which hardens as the temperature rises.

A furnace of this type has the disadvantage that it needs to have two products passing through it: on the one hand the column of carbon-containing products, and on the other hand the coke granules used as a filler. It is necessary for the coke granules to pass through the furnace since, if they did not, they would be heated excessively in the upper zone of the furnace, where all the electric current emanating from the sleeve (4) passes through them. In addition, the granules are driven downwards both by the weight and by the friction, right along the column of carbon-containing products. It is therefore important for the granules to be extracted as regularly as possible from the bottom of the furnace. They are kept at an extremely high temperature through contact with the column of electrodes, despite the proximity of the water-cooled walls (11) of the furnace (1). The column of electrodes similarly leaves the furnace at an extremely high temperature, since all the electric current passes through it as far as the contact members (7).

SUMMARY OF THE INVENTION

The possibility of developing a graphitising furnace has therefore been researched, in particular with a view to graphitising long pre-cooked carbon-containing products of circular or other cross-section, where heat insulation would be provided by a fragmented carbon-containing material which would not be entrained systematically by the passage of carbon-containing products through the furnace, and which would therefore be kept in a virtually static state inside the furnace.

The possibility of providing an electrical connection between the carbon-containing products entering the furnace and the current source has also been researched, by passing the current directly through the space located between an annular current supply member, connected to the current source, and the column of carbon-containing products, with a contact material at least partially filling the space located between that annular member and the column of carbon-containing products.

Finally, research has been carried out on the possibility of gradually raising the temperature of the carbon products which form the column and are fed into the furnace, from room temperature to graphitising temperature, with the same products undergoing progressive cooling after graphitization, before they leave the furnace.

The continuous method of graphitising long pre-cooked carbon-containing products, according to the invention, comprises displacing the long pre-cooked carbon-containing products, of circular or other cross-section in a column, along a substantially horizontal axis of passage, in a furnace where the filling material is a fragmented carbon-containing material which is not displaced inside the furnace, the column of products being heated by the Joule effect. At least one electric contact is established at the inlet of the furnace, between the column of products and one pole of a current source, the second pole of the current source being put into contact with the column of products at the downstream end of the graphitising zone inside the furnace.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
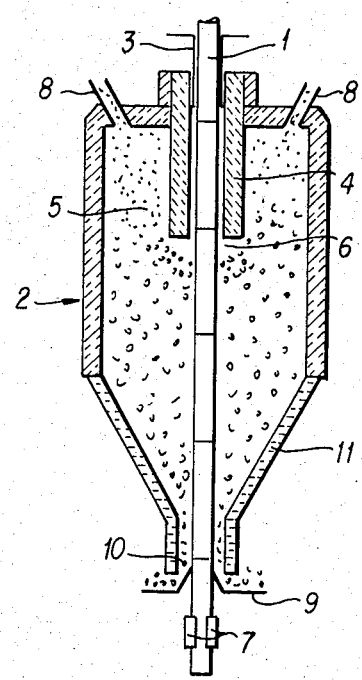
FIG. 1 is a view of elevation and in section of a known type of continuous graphitisation furnace with vertical axis.

In order to provide good electric contact between the ends of the long carbon-containing products which form the column, and also in order to give the column a certain rigidity, the whole column is put under compressive stress, by exerting forces on its two ends with pressure means such as rams, the forces being parallel with the axis of passage, directed one towards the other, and having a strength from approximately 0.1 to 1 MPa.

In the method of the invention it is advantageous to preheat the products before they enter the feed zone of the furnace. For this purpose an electric current is passed into the column of products at its upstream end, in the immediate vicinity of the pressure means, the strength of the current being from 10 to 50% of that of the current passing through the column inside the furnace. The complementary fraction of current is introduced into the column further downstream, just in the feed zone of the furnace, in a zone where the temperature of the column is already above about 500° C.

In cases where a single source of supply current is used, one of the poles thereof is connected in parallel with the column of products, at its upstream end, and further downstream in the feed zone of the furnace, while the other pole of the current source is connected to the column, actually inside the furnace.

It is equally possible to use two independent current sources. The first is a preheating current source, comprising a first pole connected to the upstream end of the column of products, and a second pole connected to the column of products in the feed zone of the furnace. The second is the graphitizing current source proper, the first pole of which is connected, like the second pole of the preheating current source, to the column of products in the feed zone of the furnace, while the second pole is connected to that same column within the furnace, at the downstream end of the graphitizing zone. Alternating or direct current may be used, according to what is available.

In accordance with the invention the column is advantageously put into electrical contact with the second pole of the graphitizing current source, at the downstream end of the graphitizing zone, by means of at least one electrical connecting conductor which extends into the furnace, with its axis substantially crossing the axis of passage of the column of products. At least one end of the conductor, remote from the column of carbon products, is connected outside the furnace to the second pole of the current source, while a different end or a different part of the electrical connecting conductor is in direct or indirect contact with the column of carbon products inside the furnace. Contact between the column of carbon products being displaced and the electrical connecting conductor is preferably provided by a layer of fragmented carbon-containing material, such as graphite particles, which fills the space between the electrical connecting conductor, the lateral wall of the column of carbon products and the portion nearest to the electrical connecting conductor. This space has a width of approximately 1 to 10 cms.

To improve current distribution it is advantageous to use two or more electrical connecting conductors, connected in parallel with the second pole of the current source, suitably distributed around the axis of passage of the column of carbon products. At least one electrical connecting conductor may be used, extending across the whole width of the furnace. The two ends of the conductor are then connected to the current source, while the central portion thereof is in direct or indirect contact with the column of products.

Gradual cooling of the column of carbon products is preferably effected by arranging at least one connecting heat conductor inside the furnace, downstream of the graphitising zone, in the fragmented carbon material. The heat conductor extends into the furnace, with its axis substantially crossing that of the column of products, and with at least one end, remote from the column of carbon products, preferably outside the furnace and cooled by a cooling means, a different end or a different part of the connecting heat conductor being directly or indirectly in contact with the column of carbon products inside the furnace. The connecting heat conductor is preferably made of graphite, at least as far as the part housed inside the furnace in the very high temperature zone is concerned. It is preferable to arrange a plurality of connecting heat conductors, distributed suitably around the axis of passage of the column of products; it is also preferable to distribute the conductors along the axis of passage of the column of products, downstream of the graphitizing zone, into the immediate vicinity of the end of the furnace through which the column of products is discharged. At least one connecting heat conductor passing right across the width of the furnace may be used. The two ends of the conductor are then outside the furnace, while the central portion is directly or indirectly in contact with the column of products.

In accordance with the invention, the column of carbon-containing products is passed through by exerting a greater pressure on it at the upstream than at the downstream end, and by adjusting that pressure to obtain regular displacement of the column of products in a downstream direction, while keeping the column under stress during its displacement. It may be displaced at constant or variable speed or step by step.

Further according to the invention, the displacement is interrupted each time the column of products has been displaced by a length equal to the unit length of a product or a multiple thereof. One or more graphitized product is then extracted from the downstream end of the column, and one or more carbon product to be graphitized is put into position at the upstream end. The column of products can then be set in motion again inside the furnace at the desired speed of displacement, when the column has been put under pressure again.

In accordance with the invention, the positioning of the products to be graphitised and also the extraction of the graphitised products may be effected without interrupting the advance of the column of products and without ceasing to keep the column under compressive stress. Such a result is obtained by using gripping and current-supplying clips at each end of the column. These enable the column to be engaged laterally during the upstream positioning of a new piece to be graphitized or the downstream removal of a piece already graphitised. These clips keep the column moving at the desired speed of displacement.

The invention also concerns a continuous graphitization furnace for long carbon-containing products, comprising a chamber which is long in the horizontal direction and provided at one end with a feed zone, through which a column of long carbon-containing products to be graphitized enters, and provided at the other end with a discharge zone through which the column emerges after being graphitized. The chamber contains a heat insulating material, comprising a fragmented carbon-containing material in contact with the column of products. An electrical contact means allows at least 50% of the current to be fed into the column of products to be graphitized; the contact means comprises an annular member, with the column of products to be graphitized passing through it, the annular member being located in the feed zone and connected to one pole of the current source. Another electrical contact means, comprising at least one electrical conductor located inside the furnace, provides an electrical connection between the column of graphitized products and the other pole of the electrical current source. It is preferable for at least one heat contact means, comprising at least one heat conductor located inside the furnace downstream of the electrical contact means, to provide a heat connection between the column of graphitized products and a fluid which is at a temperature new room temperature. The strength of the electric current flowing through the column of products is adjusted to make the temperature of the column in the hottest zone rise above 2500° C. and preferably reach 3000±200° C.

An advantageous embodiment of the invention will now be described, in a detailed but non-restrictive manner, to provide a further explanation of the invention.

Figure 2:
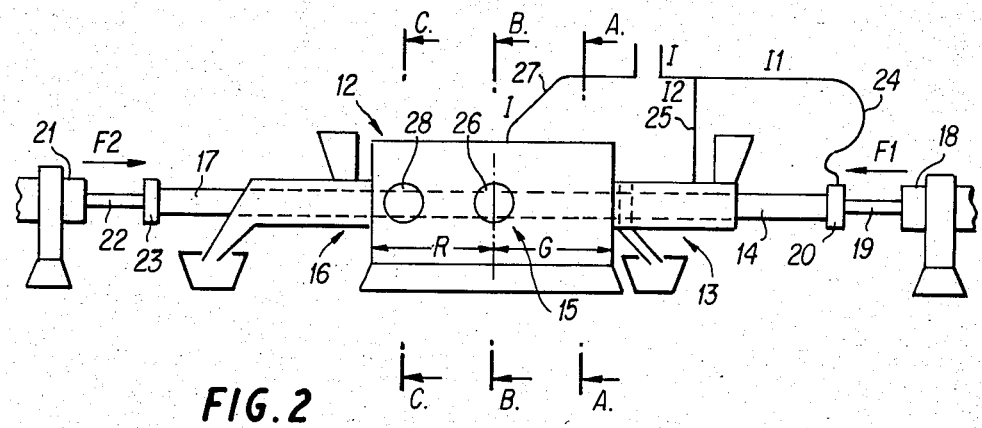
FIG. 2 is a diagrammatic elevation of a continuous graphitisation furnace according to the invention.

FIG. 2 is a diagrammatic representation of a furnace (12) of elongated shape. In a downstream direction it comprises a feed zone (13), where the column (14) of long carbon-containing products enters and is preheated, the main part (15) or body of the furnace, where the column of carbon products (14) is brought to the temperature necessary for graphitization then progressively cooled, and finally a discharge zone (16) in which the column of products, now in the graphitized state, is cooled still further to the desired temperature at which it can conveniently be exposed to the air at (17).

From the upstream side, a ram (18) provided with a piston (19) exerts a thrust force on the column (14) of products in the direction of the arrow $F_1$, by way of a bearing and electrical contact member (20) which is cooled by internal circulation of a fluid such as water.

From the downstream side a ram (21) exerts a retaining force in the direction of the arrow $F_2$ on the column of products in the zone (17), by means of its piston (22) which acts on the bearing member (23). During operation the thrust and retaining forces are adjusted so that the column of products is displaced in a downstream direction, that is to say, from right to left in the case of FIG. 2, at the desired speed, while being kept in compression with a force of approximately 0.1 to 1 MPa. A current source S, which may be alternating or direct current, enables an electric current I to be passed through the column of products to be graphitized , the strength of the current being sufficient to bring the carbon products forming the column to graphitization temperature within the furnace.

On the upstream side, experience has shown that it is preferable to connect the column of carbon products to the electrical current source at two points: a fraction $I_1$ of the current I, generally consisting of from 10 to 50% of I, is introduced at the top of the column of carbon products by means of the bearing member (20), which is connected to one pole of the electrical current source by the conductor (24). The complementary fraction $I_2$ is introduced, as shown in FIG. 2, at the level of the feed zone (13) of the furnace through the conductor (25), which is thus mounted in parallel with (24). The column of carbon products is connected to the other pole of the current source S via the electrical contact means (26) and the conductor (27).

The location of the electrical contact means (26) in the main part of the furnace (15) defines, on the upstream side, the length of the graphitization zone G, in which the column of carbon products is brought to the desired temperature to convert it into graphite. Downstream of the electrical contact means (26), a cooling zone R extends over the remaining length of the main part of the furnace; in the zone R the temperature of the column of graphitized carbon products drops well below the graphitization temperature range.

To limit heat loss from the column of carbon products during its passage through the body of the furnace, a fragmented carbon-containing material in granular or powder form is used as a heat insulator. This material occupies at least all the space directly surrounding the column of electrodes and comes right into contact with the column. In those parts of the body of the furnace which are at lower temperatures, and particularly those where the temperature is not much above 2000° C., refractories based on metal oxides in the form of refractory bricks or concretes may be used instead of the carbon-based granules.

In zone G (FIG. 3) a granular carbon material or a carbon black powder may advantageously be used as a heat insulator (30), in the immediate vicinity of the column of carbon-containing products. These two materials may also be used in alternate layers. Experience has shown that, under normal conditions of use, the passage of the column of carbon products through the inside of the furnace does not cause the fragmented carbon material to be driven towards the discharge zone of the furnace.

To enable the column of carbon products to be cooled in zone R, it is preferable for the heat insulating material used in that zone to be a fragmented carbon material (48) (see FIG. 5) with greater heat conductance than that used in zone G. For example, coke particles or graphite particles or a mixture of these particles may be used. To avoid making zone R excessively long, heat losses in that zone may be increased by positioning at least one heat conductor in the fragmented carbon material, the heat conductor comprising one or more long bars of relatively large cross-section, made of a material which is a good conductor of heat and arranged in a direction which preferably crosses the axis of the column of electrodes. These bars are arranged with at least one of their ends in the vicinity of the outer wall of the furnace, so that they can easily be cooled by a suitable means. The other end of the bars, or a running (courante) portion thereof, is in the immediate vicinity of the column of products. Graphite bars of sufficiently large cross-section are preferably used to form the heat conductors. The end (28) of such a heat conductor can be seen in FIG. 2. The number and cross-section of the heat conductors are determined so as to give the desired cooling speed for the column of graphitized products, taking into account its cross-section and speed of passage, and taking into account the length of the zone R. The larger the cross-section of the column of graphitized products, the lower its cooling speed must be.

Figure 3:
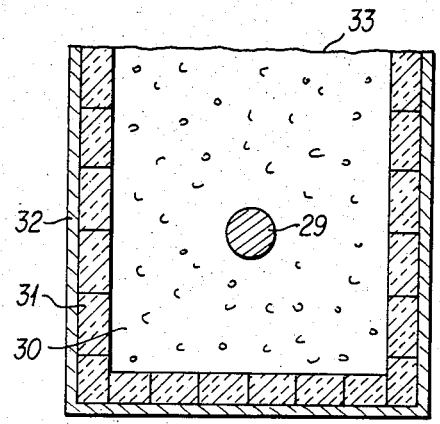
FIG. 3 is a larger-scale view of the furnace in FIG. 2, in a cross-section taken at A—A.
Figure 4:
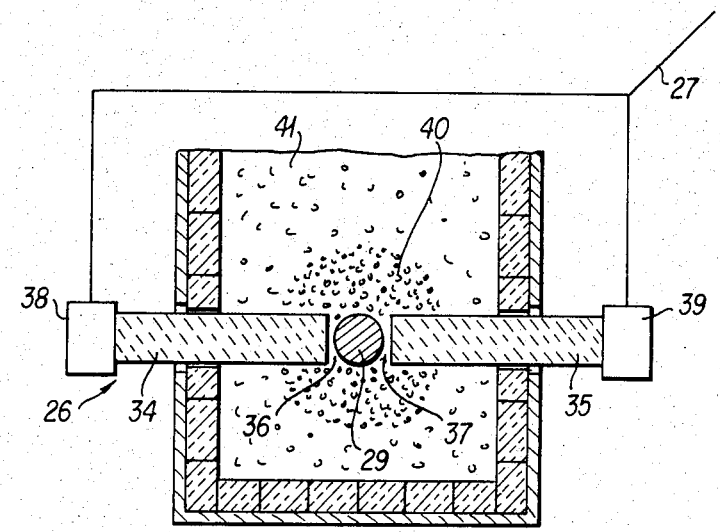
FIG. 4 is a larger-scale view of the furnace in FIG. 2, in a cross-section taken at B—B.
Figure 5:
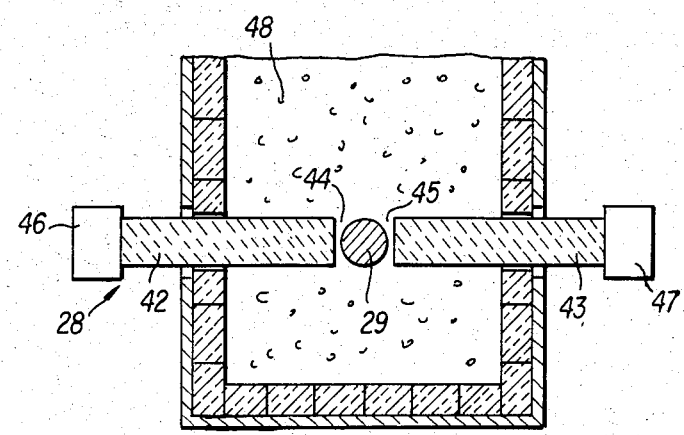
FIG. 5 is a larger-scale view of the furnace in FIG. 2, in elevation and in a larger-scale cross-section taken at C—C.

FIGS. 3, 4 and 5 show the internal structure of the body of the furnace in greater detail, in a larger scale cross-section taken in planes A—A, B—B and C—C.

FIG. 3, which is a larger scale cross-section taken at A—A in FIG. 2, shows the internal structure of the furnace in a standard (courante) part of the graphitization zone G. The column of products being graphitized (29) is entirely surrounded by a fragmented carbon material (30), of poor heat conductance, with a particle size of the order of 0.2 to 10 mm. This granular material is itself housed inside a lining of refractory bricks (31) surrounded by a sheet metal sheath (32). In some zones it may be helpful to cool the metal sheath in known manner, in order to avoid local overheating which may cause deformation. At the top (33) the fragmented carbon material is in contact with ambient air.

FIG. 4 is a larger scale cross-section taken at B—B in FIG. 2, at right angles with the electrical contact means (26). The electrical contact means can be seen to comprise two graphite bars (34-35) of e.g. circular section, arranged transversely to the axis of the column of graphitized carbon products (29). One end of each of the graphite bars is in the immediate vicinity of the column of products, a gap of a few centimeters (36-37) preferably being provided to avoid any risk of bumping. The other end of each of the bars is outside the furnace and is gripped in an electrical contact member (38-39), which is cooled by fluid circulation in a manner which is known and will not be described. The two electrical contact members are connected by the electric conductor (27) to the second pole of the current source S (see FIG. 2).

To facilitate the flow of electric current between the column of graphitized carbon products (29) and the graphite bars (34-35), a layer of fragmented carbon material of high conductivity (40), consisting of graphite particles, is preferably arranged in the gap (36-37) and in the surrounding space. This layer is preferably surrounded by a fragmented carbon material (41) of lower conductivity, such as granulated coke, in order to reduce heat loss.

As a means of further improving the quality of electrical contact between the column of graphitized carbon products and the transverse graphite bars, direct contact may be established between the moving column and the bars. For example, the column of graphitized carbon products may slide over one or more contact bars arranged below the column and possibly containing notches in an arcuate arrangement, on which the column is supported. Alternatively a contact bar might be used, extending right across the width of the furnace and with the column of graphitized carbon products in sliding contact on the centre thereof.

FIG. 5 is a larger scale cross-section taken at C—C in FIG. 2, at right angles with the connecting heat conductor (28). The heat conductor comprises two graphite bars (42-43), of e.g. circular cross-section, arranged transversely to the axis of the column of graphitized carbon products (29). Each of the graphite bars has a zone (one end of the bar in the case shown in the figure) which is in the immediate vicinity of the column of products (29), a gap of a few centimeters (44-45) preferably being provided to avoid any danger of bumping. The other end of each of the bars is outside the furnace and is cooled by a heat contact member (46-47) provided with a means of cooling by fluid circulation (not shown). The column of products (29) and the graphite bars are surrounded by a fragmented carbon material (48), such as a granulated coke material or any other fragmented carbon-containing material. It is possible, if this is found helpful, to improve heat contact between the column of products and the graphite bars by arranging a fragmented carbon-containing material of high heat conductivity, such as a granular material based on graphite, in the gap (44-45) and the surrounding space. Heat contact between the column of graphite-containing products (29) and the graphite bars may be further improved by providing a sliding contact, similar to that which may be provided at the level of the electric contact bars.

In order to accelerate the drop in temperature in zone R, it is often advantageous to arrange a plurality of connecting heat conductors along the axis of passage of the column of products, at intervals which are determined so as to give the desired curve for the drop in temperature of the graphite-containing products, taking into account their speed of passage and their cross-section. In the case e.g. of a column of products approximately 500±50 mm in diameter, the various parameters are adjusted to give a cooling speed of approximately 4° to 10° C. per minute. In the case of a column of products approximately 600±50 mm in diameter, it is preferable to reduce the maximum cooling speed so as not to exceed 7° C. per minute. Special precautions have to be taken in the feed and discharge zones of the furnace, firstly so as to prevent air from entering the body of the furnace, and secondly so as to prevent surface oxidation of the column of carbon products. In addition, satisfactory electric contact with one pole of the current source must be provided for in the feed zone of the column of carbon products, and entrainment of fragmented carbon material emanating from the body of the furnace has to be prevented in the discharge zone.

Figure 6:
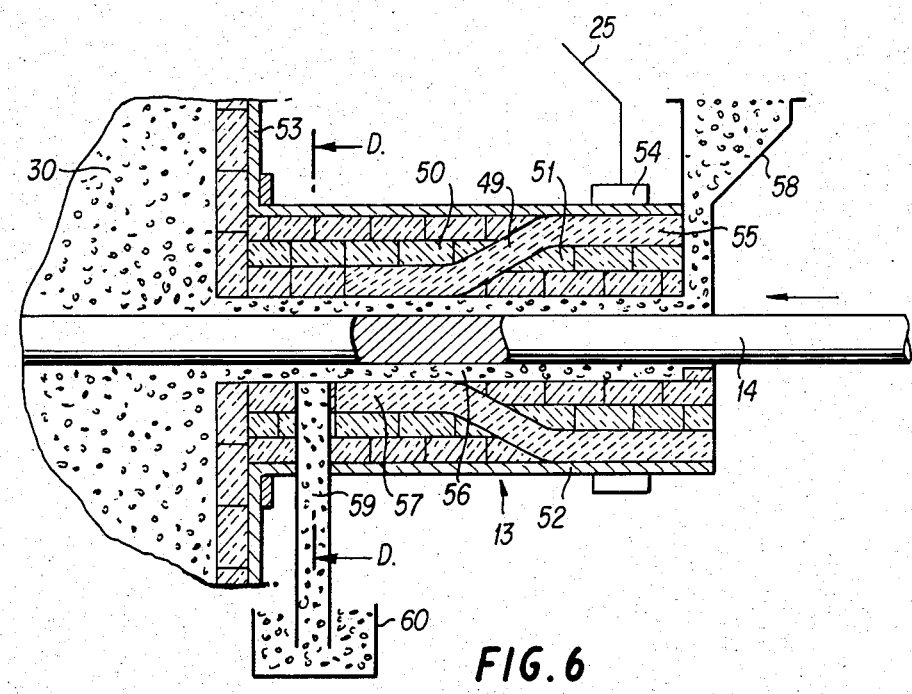
FIG. 6 shows the feed zone of the furnace in FIG. 2, in elevation and in a larger-scale cross-sectin taken along the axis of passage.

FIG. 6 is a larger scale axial section through the feed zone (13) of the furnace (12) in FIG. 2. The column of carbon-containing products (14) can be seen to pass through the interior of the tubular feed zone (13), in the direction of the arrow. The wall surrounding the column of products has an annular graphite member (49) and two annular members made of an insulating refractory material (50 and 51). An external sheath made of sheet steel (52) is cooled by a fluid circulating system (not shown). The external sheath is connected to the metal wall (53) of the body of the furnace by an insulating seal (not shown). A metal collar (54) grips the external sheath (52) in the zone where the sheath is itself in contact with the graphite member in its upstream portion (55). The collar is connected by the conductor (25) to one of the poles of the current source S (see FIG. 2). Transmission of electric current between the graphite member (49) and the column of carbon-containing products (14) is provided for by a fragmented carbon-containing material (56), which fills the gap between the column of carbon-containing products (14) and the downstream part (57) of the graphite member (49). The fragmented carbon-containing material may be particles of coke, graphite or other carbon-containing material. It is introduced at the upstream end of the feed zone through the hopper (58).

The continuous displacement of the column of electrodes tends to cause the carbon-containing material to be carried along towards the main part of the furnace. However, such entrainment is impeded by the packing of fragmented carbon-containing material (30) which fills the main part. To avoid any possible choking up, the material can flow out slowly through the passage (59), which is preferably provided in the bottom of the wall of the feed zone (13) and located at the downstream end of that zone, the aperture communicating with a receiving vessel (60) which is visible in FIGS. 6 and 7.

Figure 7:
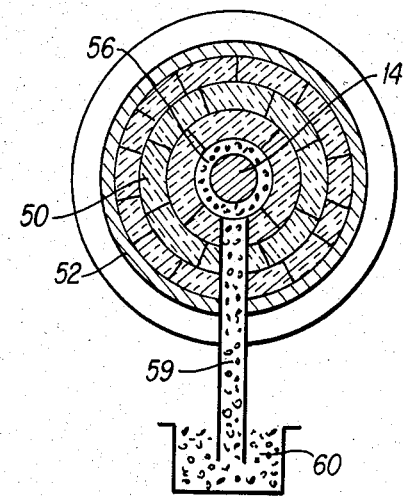
FIG. 7 is a view of the feed zone shown in FIG. 6, taken in cross-section at D—D.

FIG. 7 is a view in cross-section taken at D—D in FIG. 6, showing the flow passage (59) and the distribution of fragmented carbon-containing material (56) in the annular space surrounding the column of products (14). Owing to the presence of this material, the electrical connection between the graphite member in its downstream portion (57) and the column of products is provided right round the periphery of the column.

The special configuration of the graphite member (49), which has the current $I_2$ flowing through it, avoids cooling the cortical zone of the column of products, which has been preheated by the current $I_1$ before entering the feed zone of the furnace (see FIG. 2), cooled by fluid circulation.

To avoid this direct contact, an annular packing (51) made of an insulating refractory material is arranged between the upstream part (55) of the graphite member, which is in contact with the cold external wall (52), and the column of products (14). In addition, the graphite member is long enough for its downstream part (57) (which provides electrical contact with the column of products via the fragmented carbon-containing material) to reach a high temperature relative to that of the metal sheath (52), during normal operation, owing to the packing of insulating refractory material (50) which separates it therefrom. This arrangement enables the downstream part (57) of the graphite member to reach a temperature of approximately 500° to 1000° C. during normal operation, thus encouraging an even rise in the temperature of the column of products.

Many embodiments of the member providing the electrical connection with the column of products may be envisaged, giving results equivalent to that described. Generally speaking, a structure would be adopted in which that part of the current supply member which is in contact with the column of products, either directly or indirectly via a layer of contact material a few cms thick, would be brought to a temperature from approximately 500° to 1000° C. In the case described in FIGS. 6 and 7, the surface of the graphite member is in electrical contact with the column of products via a layer of fragmented carbon approximately 10 to 30 mm thick.

Figure 8:
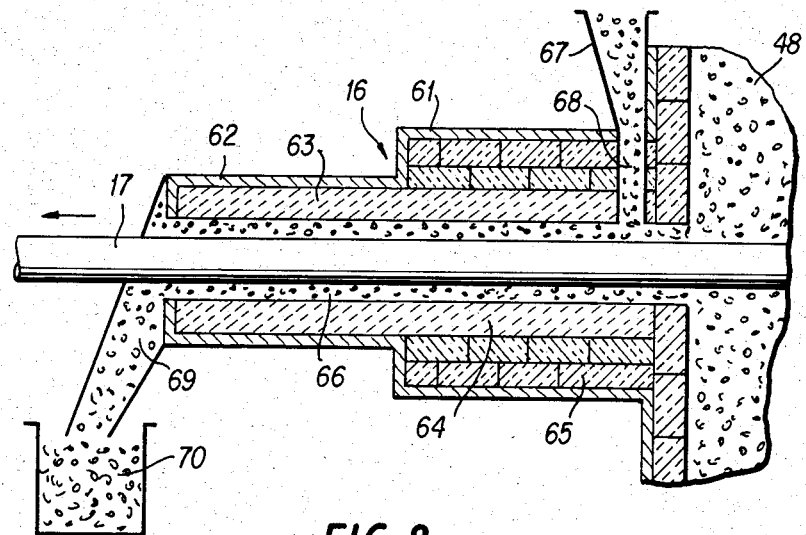
FIG. 8 shows the discharge zone of the FIG. 2 furnace, in elevation and in a cross-section taken along the axis of passage.

FIG. 8 is a larger scale axial section through the discharge zone (16) of the furnace (12).

The column of graphitised products (17) leaving the main part of the furnace can be seen to pass through a tubular chamber comprising an external metal sheath in two portions (61 and 62), which is cooled in a manner not described, by a fluid such as water. Inside the sheath an annular wall (63), preferably made of graphite, faces towards the column of graphitised products (17).

In order not to cool the column too rapidly as it leaves the main part of the furnace, the upstream portion (64) of the graphite wall is separated from the sheath (61) by means of a packing of a non-carbon-containing refractory material (65). In the downstream portion the graphite wall (63) is in direct contact with the cooled sheath (62), so as to allow the column of graphitized products to be cooled sufficiently before it is discharged to the outside. In order to prevent air from entering the main part of the furnace, and also to prevent oxidation of the column of products emerging from it, a layer of fragmented carbon-containing material (66) fills the annular space between the column of products and the graphite wall. This material is introduced through the hopper (67), which communicates with the annular space at the upstream end of the discharge zone (16) through an aperture (68) extending through the walls (64 and 65). The material is carried slowly along by the displacement of the column of products, and at the downstream end of the tubular chamber it flows away through a spout (69) into a receiving vessel (70). Appropriate recirculating means may pick up the granulated material from the vessel and return it to the hopper (67). The introduction of the fragmented carbon-containing material in the immediate vicinity of the downstream end of the main part of the furnace has, in particular, the advantage of preventing any possible entrainment of the fragmented carbon material (48) contained in the main part of the furnace, to the outside. The fragmented carbon material passing through the discharge zone may consist of granules of coke, graphite or any other stable carbon-containing material. Also in this zone, the cooling speed of the column of graphitized products is adjusted to the same speeds as in zone R. Thus, in the case of a column diameter of approximately 500±50 mm, the cooling speed will not exceed approximately 10° C. per minute up to 400° C.

Experience has shown that, owing to the mechanical stress exerted on the column of carbon-containing products passing through, the column remains in alignment, with the pieces of carbon product still forming a continuation of one another. At regular intervals the last piece in the column of products, which is in the graphitized state, is extracted from the downstream side. Similarly, a new piece of carbon product to be graphitized is introduced at the top of the column. The carbon products to be graphitized are preferably a mixture of carbon particles, such as petroleum coke or another carbonaceous material, with a suitable binder such as a hydrocarbon compound and/or a synthetic resin and/or another binder. After being shaped, the products have been pre-cooked at a temperature of approximately 600° to 1200° C. However, the granular nature of the heat insulation used in the furnace allows a large amount of volatile compounds to be liberated without upsetting the operation. Carbon products which still contain a certain percentage of volatile materials can therefore be treated in the furnace without any great disadvantage.

The two examples of use which follow show the precise conditions under which electrodes of carbon products can be graphitized by means of the furnace according to the invention.

EXAMPLE 1

A batch of carbon-containing products prepared by extrusion is treated, comprising a mixture of 75% by weight of petroleum coke and 25% of coal pitch, in the form of cylindrical bars which, after cooking at 800° C., have a diameter of 529 mm and a unit length of 2150 mm. In this state the bars have a resistivity of 6000 micro-ohms cm. The bars form a column of products which is passed through a furnace according to the invention, as shown in FIGS. 2 to 8. At the level of the contacts between the ends of each bar, a thin layer of carbon felt or compressed expanded graphite is interposed, to improve electrical contact and absorb surface irregularities. The column of carbon products comprises a total of 11 bars or pieces. The pressure exerted by the rams on the column of products as it passes through is adjusted to give a compressive stress of approximately 0.6 to 1 MPa. The speed of passage is approximately 1.5 m/h. The strength of the current passing through the contact (20) is approximately 10,000 to 15,000 amps, while the strength of the current passing through the column in the graphitizing zone G is approximately 40,000 amps. The voltage at the terminals of the alternating current source is approximately 100 volts.

In the feed zone (13) the internal diameter of the graphite contact member in its downstream portion (57) is approximately 580 mm. The length of the graphitizing zone G is approximately 6 m; it thus takes approximately 4 hours to pass through it. The cooling zone R has a length of approximately 4 m and the discharge zone (16) which extends it, a length of approximately 6.5 m. Taking into account the length of the feed zone (13), which is approximately 1.5 m, the time taken to pass the carbon product forming the column into the furnace can be seen to be approximately 12 hours, without taking into account the stoppage times necessary to discharge the graphitized pieces from the downstream end and position the pieces to be graphitized at the upstream end. The time taken to produce a graphitized piece 2.150 m long is approximately 1.5 h, taking into account stoppages to change electrodes. This corresponds to about 500 kg of graphitized product per hour. Energy consumption is of the order of 3.5 kwh/kg.

The physical properties of the products thus graphitized have been compared with those of an identical batch, which has also been graphitized through heating by the Joule effect in a single-line static furnace by the conventional industrial process (the Heroult process), described e.g. in U.S. Pat. No. 1,029,121. The results are as follows:

|  | Products graphitised as in example 1 | Products graphitised in a single line static furnace |
|---|---|---|
| Resistivity in micro-ohms cm | 850 | 830 |
| Longitudinal flexion MPa (1) | 9.5 | 9.5 |
| Apparent density T/m³ | 1.61 | 1.61 |

(1) test in accordance with standard ASTM C 651-70 with charging at 4 points.

EXAMPLE 2

The furnace used is of the same type as that described in FIGS. 2 to 8 but of substantially different dimensions, to graphitise electrodes 630 mm in diameter and 2430 mm long. The internal diameter of the downstream part (57) of the graphite contact member in the feed zone (16) is brought to 680 mm. The length of the feed zone, graphitization zone G, cooling zone R, and discharge zone are the same as in example 1. The pressure exerted on the moving column by the rams (18) and (24) is adjusted to give an axial stress of approximately 0.6 to 1 MPa. The strength of the current passing through the column of products in the graphitization zone is 55,000 amps, and the voltage at the terminals of the alternating current source is approximately 80 volts. The strength of the current introduced at the top of the column via the contact (20) is approximately 13,000 to 17,000 amps, the complement to 55,000 being introduced at the level of the contact (25). The speed at which the column passes through is 1.0 m/h. A graphitized electrode is thus extracted from the furnace in approximately 2.5 hours, taking into account the stoppage time necessary to remove the graphitized piece and put a new piece into position. The hourly production rate of the furnace is thus about 400 kg/h. The physical properties of the products thus graphitized are the same as in the case of example 1.

Very many different embodiments of the process according to the invention can be envisaged. The furnace used may itself have very many modifications without going beyond the scope of the invention. In particular, the conditions under which electric current is supplied may be adapted to the properties of the products. Similarly, the conditions under which the column of products is fed into the furnace and discharged therefrom may be adapted to the shape and dimensions of those products. In particular, it is possible to graphitize not only solid bars but also hollow bars such as tubes of various sections. None of these modifications or adaptations goes beyond the scope of the invention.

We claim:

1. A method for continuously graphitizing a long pre-cooked carbon-containing product, comprising passing the said carbon-containing product through the inside of a furnace in a column, and heating the said column of carbon-containing product by the Joule effect to a temperature of at least 2500° C., wherein the said column of carbon-containing product is arranged substantially horizontally, and wherein the said furnace is packed with a fragmented carbon-containing material which is maintained within the furnace.

2. The method of claim 1, comprising subjecting the said column of carbon-containing product to a compressive stress of approximately 0.1 to 1 MPa while passing through the furnace.

3. The method of claim 1 or 2, comprising distributing, between at least two points, an electrical connection between the column of product and at least one current source at the upstream side, and introducing a fraction of 10 to 50% of the strength of the graphitizing current at the top of the column, and the complementary fraction further downstream.

4. The method of claim 1, comprising cooling the said column to a temperature of 400° C. or lower after the column has reached a temperature of at least 2500° C., said cooling being conducted at an average speed not exceeding 10° C./min., when the said column is approximately 500±50 mm in diameter.

5. The method of claim 4, comprising using a cooling speed of 7° C./min. or less when the said column is approximately 600±50 mm in diameter.

6. A furnace for the continuous graphitization of a long carbon-containing product, comprising a long chamber which forms the body of the said furnace, said chamber having a feed zone for the product to be graphitized at one end, a means for retaining an insulating material within the said furnace, and a discharge zone at the other end; wherein the said zones are arranged along a substantially horizontal axis, along which the products to be graphitized, which are heated by the Joule effect, are displaced in a column; and wherein the said furnace contains a heat insulating material for the body of the furnace, said heat insulating material being a fragmented carbon-containing material which is in contact with the said column of product and which is retained in the said furnace by the said means for retaining an insulating material within the said furnace.

7. The furnace of claim 6, comprising a means for displacing the said column at a desired speed of passage, while exerting a compressive stress thereon.

8. The furnace of claim 7, wherein the said means for displacing the said column comprises rams.

9. The furnace of claim 6, wherein a thin layer of a carbon felt or a thin layer of compressed expanded graphite is located in between the pieces of the said carbon-containing product which forms the said column.

10. The furnace of claim 6, wherein an electrical contact between the column of carbon-containing product and one pole of the current source is provided, in the feed zone of the furnace, by means of a long graphite sleeve surrounding the column, the upstream end zone of the sleeve being connected to the current source and thermally and electrically insulated from the column of products, and the downstream end being in contact with the column of the carbon-containing product.

11. The furnace of claim 10, comprising a second electric contact connected to the same pole of the current source as the long graphite sleeve, said second electric contact being established by means of a contact member positioned at the upstream end of the column of the carbon-containing product.

12. The furnace of claim 6, comprising inside the furnace, at the end of the graphitization zone, at least one long graphite member arranged transversely, enabling an electrical connection to be established between the column of carbon-containing product and the second pole of the current source.

13. The furnace of claim 12, wherein at least one long graphite member, having at least one end connected outside the furnace to a current source and a part located inside the furnace, is in the immediate proximity of the column of product which is in electrical contact therewith either directly or via granules of fragmented carbon.

14. The furnace of claim 6 comprising, downstream of the graphitization zone, at least one connecting heat conductor arranged in the fragmented carbon-containing material so that its axis is substantially transverse to the axis of passage, at least one of its ends removed from the column of carbon-containing products being cooled by a cooling means, part of the connecting heat conductor located inside the furnace being in the immediate proximity of the column of carbon-containing products.

15. The furnace of claim 14, wherein the said heat conductor is made of graphite.

16. The furnace of claim 14, wherein a plurality of heat conductors are arranged along the axis of passage, between the graphitization zone and the downstream end of the furnace.

17. The furnace of claim 6, wherein in the feed zone, the column of product is surrounded by a layer of fragmented carbon-containing material.

18. The furnace of claim 17, comprising a means for introducing the layer of fragmented carbon-containing material at the upstream end of the feed zone, and a means for moving the material slowly along the column so that it emerges at the downstream end of that same feed zone.

19. The furnace of claim 6 wherein in the discharge zone, the column of product is surrounded by a layer of fragmented carbon-containing material.

20. The furnace of claim 19, comprising a means for introducing the layer of fragmented carbon-containing material at the upstream end of the discharge zone, and a means for moving the material slowly along the column so that it emerges at the downstream end of that same discharge zone.

* * * * *